United States Patent
McCoy et al.

(10) Patent No.: US 7,037,201 B2
(45) Date of Patent: May 2, 2006

(54) TORQUE LIMITING ASSEMBLY

(75) Inventors: Neil K. McCoy, Newfane, NY (US); John F. Quesada, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 2 days.

(21) Appl. No.: 10/731,611

(22) Filed: Dec. 9, 2003

(65) Prior Publication Data
US 2005/0124418 A1  Jun. 9, 2005

(51) Int. Cl.
*F16D 7/10* (2006.01)

(52) U.S. Cl. .......................................... 464/37; 474/902

(58) Field of Classification Search ............... 192/56.5, 192/56 R; 464/37, 41; 474/70, 902; 417/223, 417/319
See application file for complete search history.

(56) References Cited

U.S. PATENT DOCUMENTS

| | | | |
|---|---|---|---|
| 1,865,559 A * | 7/1932 | De Montgrand | .......... 464/37 X |
| 2,444,530 A | 7/1948 | Richards | |
| 3,203,524 A | 8/1965 | Orwin | |
| 3,724,815 A * | 4/1973 | Hawkins et al. | .......... 464/37 X |
| 6,234,904 B1 * | 5/2001 | Kawaguchi et al. | .... 417/223 X |
| 2004/0211639 A1 | 10/2004 | Dion | |

FOREIGN PATENT DOCUMENTS

EP   1207316   5/2002

* cited by examiner

*Primary Examiner*—Greg Binda
(74) *Attorney, Agent, or Firm*—Patrick M. Griffin

(57) ABSTRACT

A torque limiting device features spring arms that extend resiliently and spirally from a driven member to distal ends rotatably supporting cams that engage cam posts on a drive member to transmit rotation from the drive member to the driven member. In response to a predetermined reactive force, the spring arms are resilient and move radially, and the cams rotate to allow the distal ends to spring past the cam posts in response to a predetermined reactive force.

5 Claims, 3 Drawing Sheets

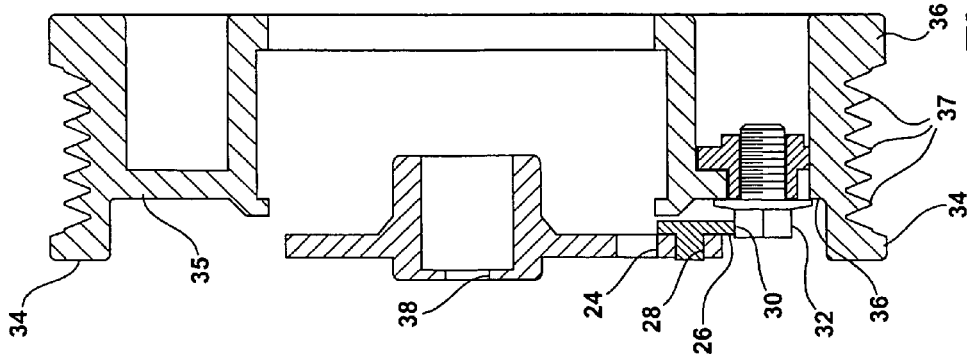
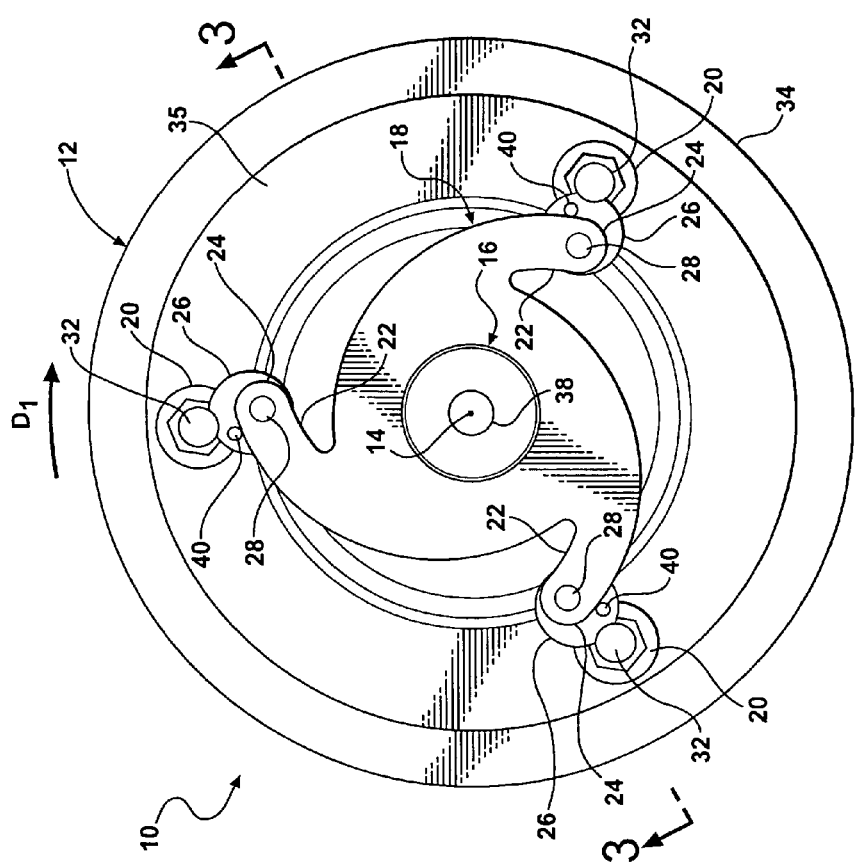

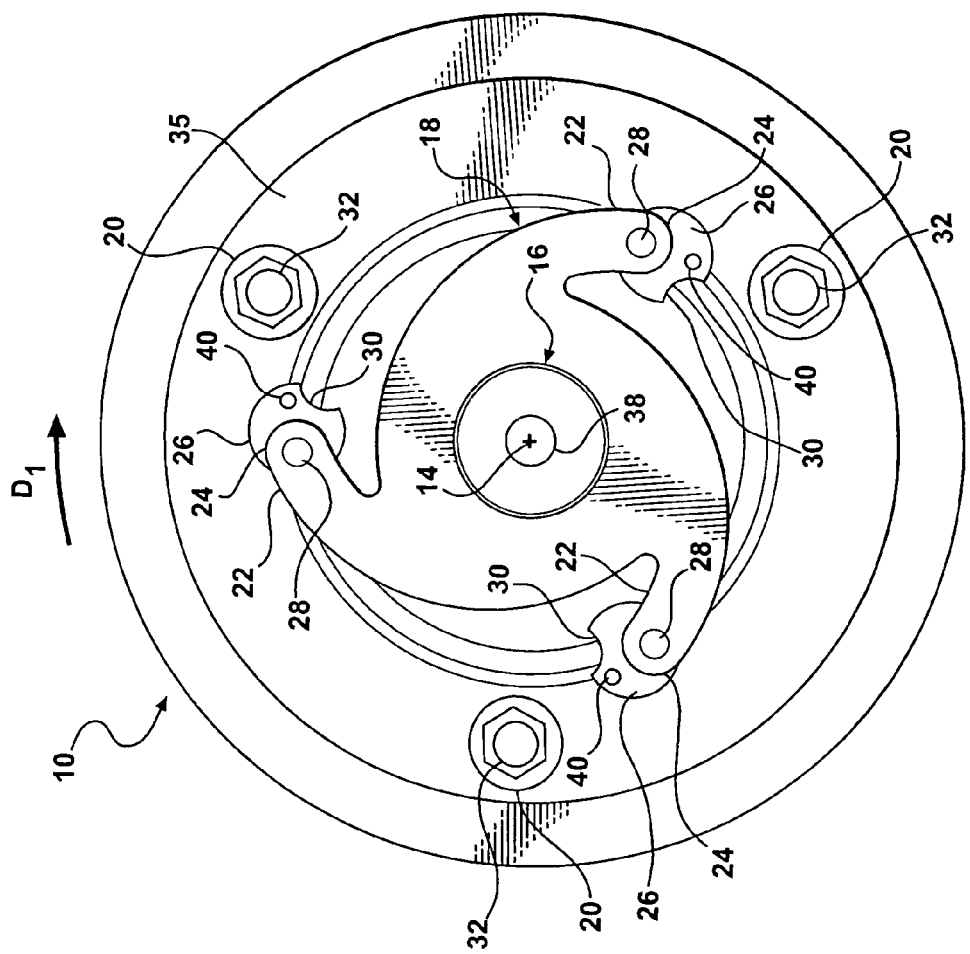
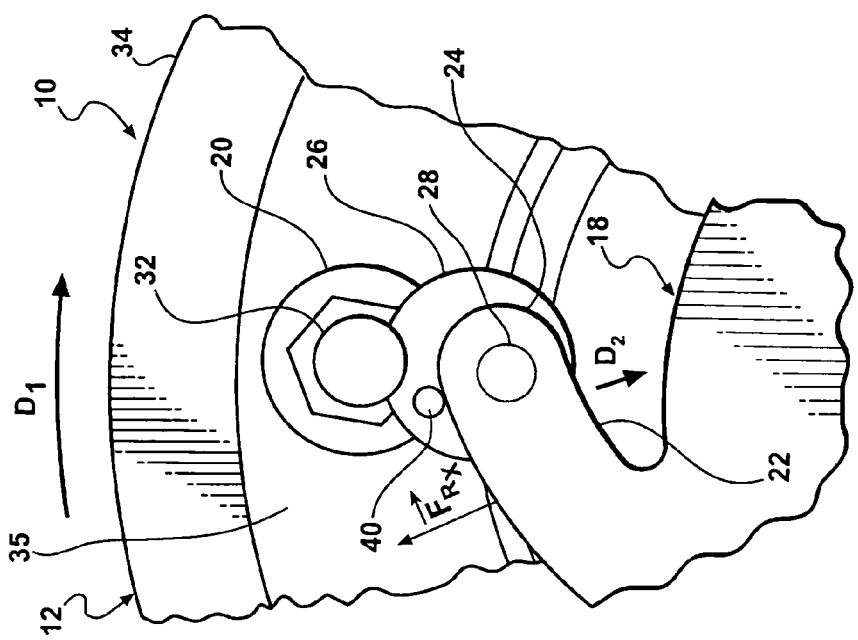

TORQUE LIMITING ASSEMBLY

BACKGROUND OF THE INVENTION

1. Field of the Invention

The subject invention relates to a transmission and torque limiting assembly intended for use in transmitting rotation from a drive to a compressor.

2. Description of the Related Art

Various torque limiting devices exist in the art that are used in compressors to decouple compressor shafts from driven members such as gears or pulleys. Although they may be used with almost any type of compressor, such devices are often used in compressors lacking an electromagnetically activated device or other type of clutch to engage or disengage the compressor shaft from the driven member. Referred to as a "clutchless" compressor, this type of compressor has a shaft coupled to a driven member that is in turn coupled to the accessory belt system of an engine. When the engine crankshaft rotates, the belt system rotates, which also causes the driven member and shaft to rotate.

A torque limiting device typically engages both the driven member and the compressor shaft, and transmits the rotation of the driven member to the shaft. Should an unforeseen malfunction occur within the compressor to cause the rotating shaft to seize or "lock up" and resist rotating in the same direction as the driven member, the torque limiting device will disengage the shaft from the driven member. This permits the disengaged driven member to continue rotating, and keeps the shaft from generating and transmitting a damaging reactive force to the engine.

An example of a torque limiting device is disclosed in U.S. Pat. No. 5,706,922 ("Bondioli"). The Bondioli device utilizes multiple components to accomplish the straightforward act of disengaging a pulley from a shaft. In particular, the pulley of the Bondioli device has recesses that cooperate with wedge-shaped sliders. Each slider engages one of several pairs of pads carried by the device. The pads are urged together by underlying springs. The slider engages the pair at the point at which the pads intersect. The slider also engages one of the recesses in the pulley, and pivots in response to a torque applied by the rotating pulley on the slider. This urges the slider against the intersecting edges of the pads, and causes the pads to separate. The underlying springs compress and move away from one another in response. The slider continues to press against the pads and springs until it has pivoted free from the recess on the pulley. Once all of the sliders disengage the recesses, the compressor shaft disengages the pulley.

The Bondioli device is complicated and does not work unless multiple parts simultaneously cooperate to ensure that the compressor shaft is quickly disengaged from the pulley. Because so many components are used, rotation must be transmitted from the pulley to the compressor shaft through several energy-expending, intermittent steps. Thus, the Bondioli device fails to provide an efficient, cost-effective way to disengage a compressor shaft from a pulley or other driven member.

BRIEF SUMMARY OF THE INVENTION AND ADVANTAGES

The invention provides a transmission and torque limiting assembly for transmitting rotation from a drive to a compressor. The assembly includes a driven member for rotation by the drive about an axis. A drive member is disposed about and coaxial with the driven member. A mechanism transmits rotation to the driven member from the drive member and disengages the driven member from the drive member in response to a predetermined reactive force between the members. The driven member comprises spring arms extend resiliently and spirally to distal ends and cams pivotally attached at the distal ends. The cams engage posts on the drive member to transmit rotation from the drive member to the driven member. The arms also move resiliently and radially to allow the distal ends to spring past the posts in response to the predetermined reactive force.

Accordingly, the subject invention overcomes the limitations of the related art by providing a torque limiting assembly featuring a simplified mechanism that not only transmits rotation from a drive member to a driven member, but also disengages the drive member from the driven member to prevent inadvertent damage to the engine or other source providing power to the driven member. This is achieved by providing a unique driven member with integrally formed spring arms and cams that selectively disengage complementary posts located on the drive member.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein:

FIG. 2 is a side view of the torque limiting assembly shown in FIG. 1;

FIG. 3 is a cross-sectional view of the torque limiting assembly taken from Line 3—3 of FIG. 2;

FIG. 4 is a fragmentary side view of one of the spring arms and cam mechanisms moving out of the locked position; and FIG. 5 is a side view of the torque limiting assembly with the cams released from the posts.

DETAILED DESCRIPTION OF THE INVENTION

Figure 1:
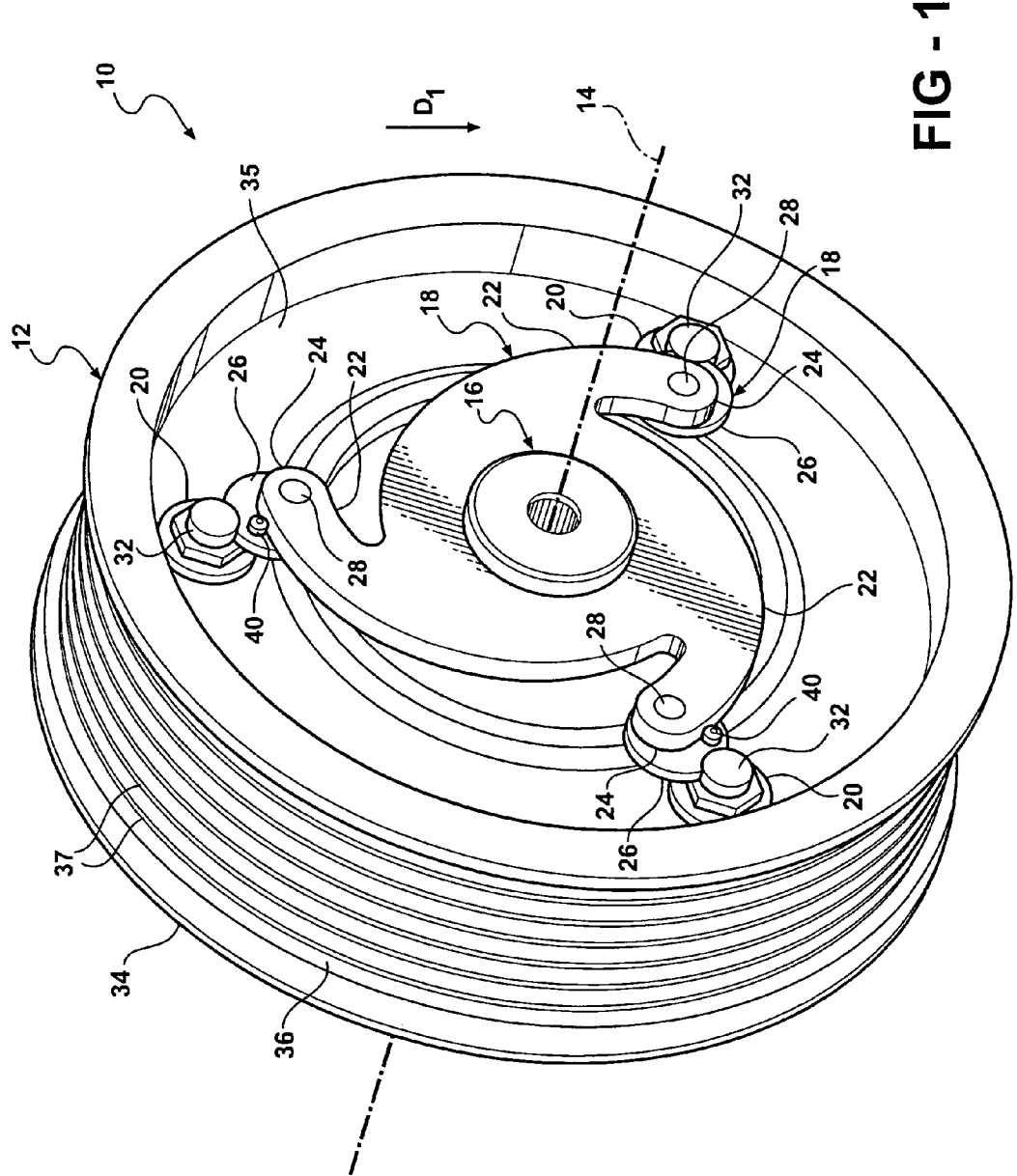
FIG. 1 is a perspective view of a torque limiting assembly according to one embodiment of the present invention with the cams engaging the posts in a locked position.

Referring to the Figures, wherein like numerals indicate like or corresponding parts throughout the several views, a transmission and torque limiting assembly for transmitting rotation from a drive to a compressor is shown generally at 10. The assembly 10 includes a drive member 12 for rotation by the drive about an axis 14 in the direction "$D_1$" shown. A driven member 16 is disposed within and coaxial with the drive member 12. The drive member 12 is operatively connected to an engine or other suitable power source by a belt assembly (not shown).

The assembly 10 also includes a mechanism 18 for transmitting rotation from the drive member 12 to the driven member 16. The mechanism 18 also disengages the driven member 16 from the drive member 12 in response to a predetermined reactive force component "$F_{Rx}$" between the members 12 and 16. This is achieved through cams 26, which are pivotally attached to spring arms 22. Spring arms 22 extend resiliently and spirally from the drive member 12 to distal ends 24 for engaging the cams 26 to transmit rotation from the drive member 12 to the driven member 16. Using the spring arm 22 shown in FIG. 4 as a representative example, each spring arm 22 also resiliently moves radially in the direction "$D_2$" shown to allow the distal end 24 to spring past the cam 26 in response to the predetermined reactive force component "$F_{Rx}$".

The distal ends 24 include cam 26 to transmit the rotation from the drive member 12 to the drive member 16. As is shown in FIG. 5, the cams 26 are released from posts 32 axially extending from bolts 20 attached to drive member 12 in response to the predetermined reactive force component "$F_{Rx}$" as the spring arms 22 move resiliently. Each cam follower 26 includes a pivot 28 that pivotally connects the cam 26 to one of the distal ends 24. Each cam 26 has a recess 30 for receiving a selected one of posts 32 to move the cam 26 out of a locked position such as that shown in FIG. 1. Each recess 30 is complementary to each post 32.

Although any suitable device may be used, the drive member 12 is a pulley 34 with a planar face 35. The pulley 34 also includes an outer surface 36 in which grooves 37 are formed for engaging a belt (not shown) to operatively connect the pulley 34 to the engine or other power source. The posts 32 extend axially from the planar face 35. A hub 38 is coaxially disposed within the pulley 34. The spring arms 22 are integrally formed with the hub 38 and extend radially and spirally between the hub 38 and the posts 32. This positions the cams 26 so that they can engage the posts 32.

A stop pin 40 is carried by each of the cams 26. The stop pin 40 reacts with the adjacent distal end 24 to limit pivotal movement of the cam 26 in one direction. This maintains each cam 26 in the locked position shown in FIG. 1 to permit transmission of rotation from the drive member 12 to the driven member 16. As is shown in FIGS. 4 and 5, this also allows pivotal movement of each cam 26 out of the locked position in response to the predetermined reactive force component "$F_{Rx}$".

Obviously, many modifications and variations of the present invention are possible in light of the above teachings. The foregoing description of the invention is provided for the purpose of illustration only and not for the purpose of limitation—the invention being defined by the claims.

We claim:

1. A transmission and torque limiting assembly for transmitting rotation from a drive to a compressor, said assembly comprising;
    a driven member for rotation by the drive about an axis and comprising a hub,
    a drive member disposed about and coaxial with said driven member, wherein said drive member is a pulley with a planar face,
    a mechanism for transmitting rotation from said drive member to said driven member and for disengaging said drive member from said driven member in response to a predetermined reactive force between said members,
    said mechanism including posts axially extending from said planar face, and spring arms integrally formed with said hub and extending resiliently and spirally from said hub, said spring arms including cams pivotally attached to distal ends thereof for engaging said posts for transmitting rotation to said driven member from said drive member, said spring arms resiliently moving radially to allow said cams to release from said posts in response to the predetermined reactive force.

2. A torque limiting assembly as recited in claim 1 and including a pivot pivotally connecting one of said cams to each of said distal ends.

3. A torque limiting assembly as recited in claim 2 and including a stop pin carried by each of said cams for reacting with the adjacent distal end to limit pivotal movement of each cams in one direction to maintain each cam in a locked position for permitting transmission of rotation to said driven member from said drive member and for allowing pivotal movement of each cam out of said locked position in response to the predetermined reactive force.

4. A torque limiting assembly as recited in claim 3 wherein each of said cams includes a recess for receiving a selected one of said posts for moving said cam out of said locked position.

5. A transmission and torque limiting assembly for transmitting rotation from a drive to a compressor, said assembly comprising;
    a pulley having a planar face for rotation by the drive about an axis,
    a driven member having a hub coaxially disposed within said pulley,
    a plurality of posts extending from said planar face,
    a plurality of spring arms integrally formed with said hub and extending radially and spirally therefrom to distal ends, and
    a plurality of cams carried by said distal ends for engaging said posts for transmitting rotation from said pulley to said driven member and for causing said spring arms to resiliently move radially to allow said distal ends to spring said cams past said posts for disengaging said driven member from said pulley in response to a predetermined reactive force,
    each of said cams including a pivot pivotally connecting said cam to a selected one of said distal ends,
    a recess for receiving a selected one of said posts, and
    a stop pin carried by each of said cams for reacting with said selected distal end for limiting pivotal movement of said cam in one direction to maintain said cam and said selected post in a locked position for permitting transmission of rotation from said pulley to said driven member and for allowing pivotal movement of said cam out of said locked position in response to the predetermined reactive force.

* * * * *